(No Model.)

J. T. SHULTZ.
TRUCK FOR MOVING HOUSES.

No. 351,806. Patented Nov. 2, 1886.

Witnesses.
N. A. Haseltine,
G. A. Clarke.

Inventor.
Joseph T. Shultz
By S. A. & S. C. Haseltine

UNITED STATES PATENT OFFICE.

JOSEPH T. SHULTZ, OF SPRINGFIELD, MISSOURI, ASSIGNOR OF ONE HALF TO JOHN B. GLASS, OF SAME PLACE.

TRUCK FOR MOVING HOUSES.

SPECIFICATION forming part of Letters Patent No. 351,806, dated November 2, 1886.

Application filed July 9, 1886. Serial No. 207,556. (No model.)

*To all whom it may concern:*

Be it known that I, JOSEPH T. SHULTZ, a citizen of the United States, residing at Springfield, in the county of Greene and State of Missouri, have invented certain new and useful Improvements in Trucks for Moving Houses; and I do hereby declare the following to be a full, clear, and exact description of the invention, such as will enable others skilled in the art to which it appertains to make and use the same.

My invention relates to improvements in trucks for moving houses, barns, &c., the object of which is to provide a cheap, simple, durable, and convenient device for moving houses, barns, &c., and one that may be guided in any desired direction, as hereinafter described. These objects I attain by means of the device illustrated in the accompanying drawings, forming a part of this specification, in which—

Figure 1:
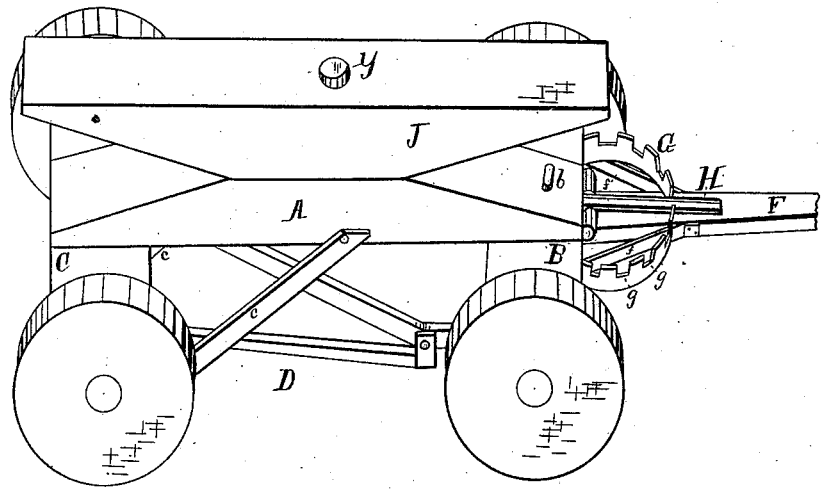
Figure 2:
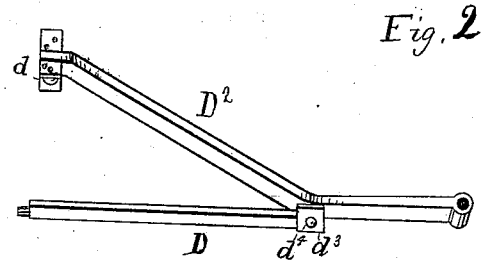

Figure 1 is a view in elevation of the device. Fig. 2 is a detail showing the reach.

Similar letters of reference indicate corresponding parts in the several figures.

C is the hind axle, firmly attached to and supporting one end of a suitable connecting-piece, A. Axle C is provided with suitable braces, $c\ c$, which are attached to it at either side near its ends and extended forward, and are secured to connecting-piece A. A suitable reach, D, is attached to the axle C and extends forward, and is attached at the other end to the reach $D^2$ by any suitable means, as by means of the ears $d^3$, extending down from $D^2$, and being provided with holes $d^4$ for receiving a bolt, which passes through the sides of ears $d^3$, and through the end of reach D.

B is a front axle, and is provided with a suitable king-bolt, $b$, which extends down through connecting-piece A, said connecting-piece having suitable bearings upon it, then passing through the axle B, and through the front end of reach $D^2$.

$D^2$ is a suitable reach, and extends down from the under side near the rear end of connecting-piece A, where it is secured at one end by means of a hinged joint, $d$. Near its middle it is provided with ears $d^3$, for securing the front end of reach D.

Attached to axle B is a tongue, F, for guiding the truck. Said tongue is provided with suitable braces, $f\ f$, for holding the tongue firmly in place. Attached to the upper side of tongue F is a semicircle, G, having notches $g$ for receiving the guide-rod H.

H is a guide-rod, which is hinged to the front end of connecting-piece A, and is for entering the notches $g$ when guiding the trucks. Secured to the upper side of connecting-piece A is a suitable rocker, J, which is attached to the connecting-piece by means of a bolt, Y.

Having thus described my invention, what I claim as new, and desire to secure by Letters Patent, is—

1. The combination of wheels K, axles B C, having a connecting-piece, A, with reaches D $D^2$, reach $D^2$ being secured to the axle B by means of a king-bolt, $b$, and a rocker, J, substantially as shown and described.

2. In a truck for moving houses, a tongue, F, having braces $f f$, and provided with a semicircle, G, having notches $g$, and a connecting-piece, A, having a hinged guide-rod, H, substantially as and for the purpose set forth.

3. In a truck for moving houses, the combination of wheels and axles, with reaches D $D^2$, connecting-piece A, having braces $c\ c$, king-bolt $b$, tongue F, having braces $f f$, semicircle G, having notches $g$, hinged guide-rod H, and rocker J, substantially as shown and described.

In testimony whereof I affix my signature in presence of two witnesses.

JOSEPH T. SHULTZ.

Witnesses:
S. C. HASELTINE,
S. A. HASELTINE.